(12) United States Patent
Kurz et al.

(10) Patent No.: US 6,660,958 B2
(45) Date of Patent: Dec. 9, 2003

(54) ARC WELDING METHOD AND APPARATUS

(75) Inventors: Roland Kurz, Linden-Leihgestern (DE); Stefan Napierala, Marburg (DE); Richard L. Eberling, Allenton, MI (US); Simon Harries, Berkshire (GB)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/111,861
(22) PCT Filed: Aug. 30, 2001
(86) PCT No.: PCT/US01/27040
§ 371 (c)(1),
(2), (4) Date: Apr. 29, 2002
(87) PCT Pub. No.: WO02/18087
PCT Pub. Date: Mar. 7, 2002

(65) Prior Publication Data
US 2002/0153357 A1 Oct. 24, 2002

(30) Foreign Application Priority Data
Aug. 30, 2000 (GB) .............................................. 0021316

(51) Int. Cl.⁷ ................................................. B23K 9/20
(52) U.S. Cl. ........................................... 219/99; 219/74
(58) Field of Search ............................. 219/74, 98, 99

(56) References Cited

U.S. PATENT DOCUMENTS

| | | | | |
|---|---|---|---|---|
| 2,549,804 A | * | 4/1951 | Graham | 219/98 |
| 2,727,123 A | * | 12/1955 | Gregory, Jr. | 219/98 |
| 2,790,066 A | * | 4/1957 | Haynes et al. | 219/98 |
| 3,495,066 A | * | 2/1970 | Broyard et al. | 219/74 |
| 3,989,920 A | * | 11/1976 | Masubuchi et al. | 219/98 |
| 4,306,137 A | * | 12/1981 | Shoup et al. | 219/99 |
| 5,349,152 A | * | 9/1994 | Renner | 219/99 |
| 5,938,946 A | * | 8/1999 | Kurz | 219/99 |
| 5,981,896 A | * | 11/1999 | Keanini et al. | 219/74 |
| 6,060,690 A | * | 5/2000 | Tyagi | 219/137.42 |

* cited by examiner

Primary Examiner—M. Alexandra Elve
Assistant Examiner—Len Tran
(74) Attorney, Agent, or Firm—Edward D. Murphy

(57) ABSTRACT

A process and apparatus for welding a metal component to a metal workpiece. The component typically comprises a metal weld region and a threaded connector region and the apparatus includes a weld head comprising a nozzle for holding the weld region of the component adjacent the workpiece. The weld head induces a weld arc between the weld region of the component and the workpiece to create a weld pool of molten material. The weld head subsequently moves the weld region into the weld pool to permanently join the component to the workpiece. The apparatus further comprises a pressurized fluid source and a fluid flow control means for directing the pressurized fluid between the weld head and the component an weld pool so as to deflect any airborne fluid residue of the weld pool away from the connector region of the component.

32 Claims, 6 Drawing Sheets

ARC WELDING METHOD AND APPARATUS

The invention relates to a process and apparatus for arc welding of a metallic component to a metallic structure. More particularly, the invention relates to the welding of a metallic stud or nut to a metallic sheet on which stud or nut is to be used as an anchorage.

The welding of metallic studs and nuts to a metallic structure by means of arc welding is a widespread process found in particular application in the automotive industry. The exact method of the welding process can be relatively varied but the general principal involves the formation of an electric arc between the stud and the metal sheet effecting relative melt of the metallic materials in the region of the arc so that the metal component can then be lowered into the melt which is formed in the fusion region to result in a strong welded connection being formed between the component and the metal structure on subsequent cooling.

One form of welding process is the so called drawn arc welding process which involves positioning the component to be welded to the metal sheet within a weld gun and bringing the component into electrical contact with the metallic surface to complete an initial circuit indicating that the metal component is in contact with the metal sheet. The weld cycle is then initiated whereby the stud is withdrawn from the work surface inducing a pilot arc which serves to help clean both the component and the work surface before a main welding current is initiated creating a weld arc between the raised component and the metal sheet. The weld arc serves to form a pool of molten metal on the sheet material and also on the metallic component. The welding apparatus then causes the component to be plunged into the molten metal whereby as the weld pool solidifies it forms a homogenous joint. The entire process takes less than a second and forms a joint which in fact is stronger than material that has actually been welded. Such a drawn arc welding process is standard within the welding industry and is used to attach both studs and nuts to metal sheets which allow further fastenings to be connected thereto. In this manner studs themselves may often be threaded to receive a co-operating threaded nut or a nut itself may be welded directly onto the sheet in order to receive a screw threaded connector. Usually such studs and nuts are to enable earthing connections to be made to the sheet metal and thus require good electric contact to be made between the stud or nut and the appropriate connector element fixed thereto. However, it has been found that even with the cleaning function of the pilot arc, the intense heat generated by the arc during the welding process results in the formation of vaporised carbon and other impurities which can result in a "smoke" emanating from the molten material. Condensation of this smoke and vaporised impurity on the threads above the welded nut or stud can serve to inhibit electrical contact with the subsequent connection and impair the threaded engagement between the component and threaded connector.

Furthermore, it has been found that due to the reactive forces generated by the formation of the arc itself and also by the driving of the component into the molten metal can result in the formation of splashes of molten metal whereby if such splashes land on the thread of the nut or the stud, then they again will solidify to inhibit the screw threaded operation of such nut or stud. It is therefore an object of the present invention to provide for an improved welding process and welding apparatus to alleviate the aforementioned problems in a manner which will not inhibit the speed or quality of the welding procedure.

According to one aspect of the present invention there is provided a method of welding a substantially metal component to a metal workpiece, comprising the steps of: creating a weld arc between said component and metal workpiece to create a weld pool of molten material and initiating a pressurised fluid flow over said component and the weld pool to deflect any airborne fluid residue of the weld pool away from said component during the displacement of the component into the weld pool.

Preferably, where the method is applicable to a component which comprises a metal weld region and a connector region, the weld arc is created between the metal weld region of the component and the metal workpiece to create a weld pool and the pressurised fluid flow is initiated so as to be disposed between the connector region of the component and the weld pool to deflect the fluid residue of the weld pool from the connector region. Usually the flow of pressurised fluid is initiated as least substantially simultaneously with the creation of the weld arc or before creation of the weld arc.

Where the connector region is threaded, the method will usually comprise the step of deflecting the fluid flow through a channel formed by the thread of the threaded region. In particular, where the component is a weld nut the pressurised fluid flow is directed through the central aperture of the nut to create a positive pressure within the aperture of the nut which prevent any splashes of molten weld material or gases from entering this region. The method will also preferably comprise the step of placing a solid cylindrical insert in frictional engagement with the internal threads of the nut in order to form sealed channels with the thread through which the fluid flow can then be directed. In this manner the pressurised fluid is further compressed through this threaded channel to create a high positive pressure which prevents any airborne particulate from the weld procedure from being thrown or drawn into the threaded region of the nut.

The pressurised fluid may be given a straight flow path prior to being directed through the nut. This flow path can be induced by passing the fluid through at least one longitudinally extending channel, usually formed within a solid control valve placed in the fluid path, and more usually the flow is induced by passing through six such channels, which are equally spaced angularly about the central axis of the fluid flow path.

The pressurised fluid may also be given a spiral flow path prior to being directed through the nut. Thus when the fluid flow engages with the spiral threads of the nut it has already partially aligned with such threads and therefore readily engages and enters the channels formed between the threads of the nut. This spiral flow path is preferably induced by passing the fluid through at least one spiral channel, usually formed within a solid control valve placed in the fluid path, and more usually the spiral flow is induced by passing through six such channels, which are equally spaced angularly about the central axis of the fluid flow path. The spiral channels are usually set to deflect the fluid flow at an angle of between 10 and 80° relative to a plane perpendicular to the direction of fluid flow and more particularly the angle of deflection generated is between 50 and 70°.

The pressurized fluid may also b allowed to expand after the spiral flow path is induced therein. Preferably, the fluid use in this method will be compressed air directed from a pressurized air source at a flow ate of between 5 and 30 liters per minute and preferably between 10 and 20 liters per minute.

Furthermore, according to a second aspect of the present invention there is provided apparatus for directing a pressurised fluid flow over a substantially metal component during arc welding, the fluid flow being directed by said apparatus so as to deflect any airborne fluid residue created by the welding process away from the component.

According to a further aspect of the present invention there is also provided welding apparatus for welding a substantially metal component to a metal workpiece, said component comprising a metal weld region and a connector region, said apparatus comprising a weld head having means for holding said weld region of said component adjacent said workpiece and inducing a weld arc between said weld region and workpiece to create a weld pool of molten material, whereby the weld head subsequently displaces said weld region into said weld pool; said apparatus further comprising a pressurised fluid source and a fluid flow control means for directing said pressurised fluid over said component and the weld pool so as to deflect any airborne fluid residue of the weld pool away from said connector region of said component.

Usually such apparatus will comprise control means for initiating fluid flow at least substantially simultaneously with or before the creation of the weld arc. Such control means will usually be by means of a computerised control station as are conventional for arc welding apparatus (both automated and hand held) whereby such control unit will detect, by means of a test voltage, when welding should occur and thereby automatically directs a weld current to the weld head to create the weld arc. Such a computerised control unit can, simultaneously or slightly prior to inducing the weld current, initiate fluid flow from the fluid source in a conventional manner such as opening a valve or any other conventional method of transmitting a pressurised fluid from a pressurised fluid source. This computerised control unit will also control displacement of the weld head and nozzle.

The welding apparatus will usually be used with a component having a threaded connector region whereby the fluid control means will comprise a directing member on the outer edges of the threads so as to form a substantially sealed channel therewith and to then direct such fluid flow through this thread channel. With an externally threaded member such as a screw threaded stud such a directing member may form a tubular body which slides over the exterior surface of the stud so as to engage such threads, but in the case of a threaded nut then the outer edges of the threads are directed about the internal periphery of the internal nut aperture in which case a cylindrical body is inserted into the nut so as to engage these threads.

The fluid flow control means will usually comprise a substantially hollow fluid transmitting member with an end stop for substantially forming a sealed engagement with the upper surface of a weld nut so that fluid flow is directed through the central aperture of such nut. Such fluid flow will then be prevented from continued displacement through such nut where the cylindrical body has been inserted and thus is forced into the channel formed between the thread of the nut and the cylindrical body to pass therethrough. This provides the advantage of specifically directing the pressurised fluid flow through the threads of the nut and also serves to increase the pressure of the fluid through these channels thereby preventing any airborne residual particles from the weld pool from entering by the nut thread.

The welding apparatus will also preferably comprise a control valve disposed between the fluid source and the nut for inducing a flow path in the fluid flow. This control valve will usually comprise a solid body having at least one channel extending therethrough. The control valve will be cylindrical and may have six channels formed about its periphery so as to be equally spaced angularly about the axis of such valve. The channels may by spiral and, if so, will usually be formed at an angle of between 10 and 80° to a plane perpendicular to the direction of flow.

In addition, a deflector may be disposed in the fluid flow in front of the control valve and angularly inclined in the direction of fluid flow to gradually deflect fluid flow towards the entrances to the spiral channels. This is to alleviate the formation of eddy currents whereby the pressurised fluid is forced through the smaller apertures of the spiral channels which could disrupt formation of the spiral fluid flow. Usually such a deflecting member comprises a cone.

In addition, where the fluid flow has been compressed through channels in a fluid control valve the fluid control means may comprise an expansion chamber in which the fluid may enter after passing through the fluid control valve to allow expansion of the pressurised fluid after spiral flow is induced. This expansion of the pressurised fluid enables the spiral flow path to be retained but reduces the pressure slightly after having been compressed through the channels in the control valve so that it more readily engages with and enters into the channels formed between the threaded region of the nut and the cylinder placed therein.

This welding apparatus is highly applicable to existing welding apparatus whereby the leading arm of conventional weld heads can be utilised to form a substantially airtight cylinder through which the fluid flow may pass and thus be directed to the component during the weld operation whereby the weld control valve can be simply incorporated within the end of such a member 14.

The invention will now be described, by way of example only, with reference to the accompanying illustrative drawings as follows.

Figure 1:
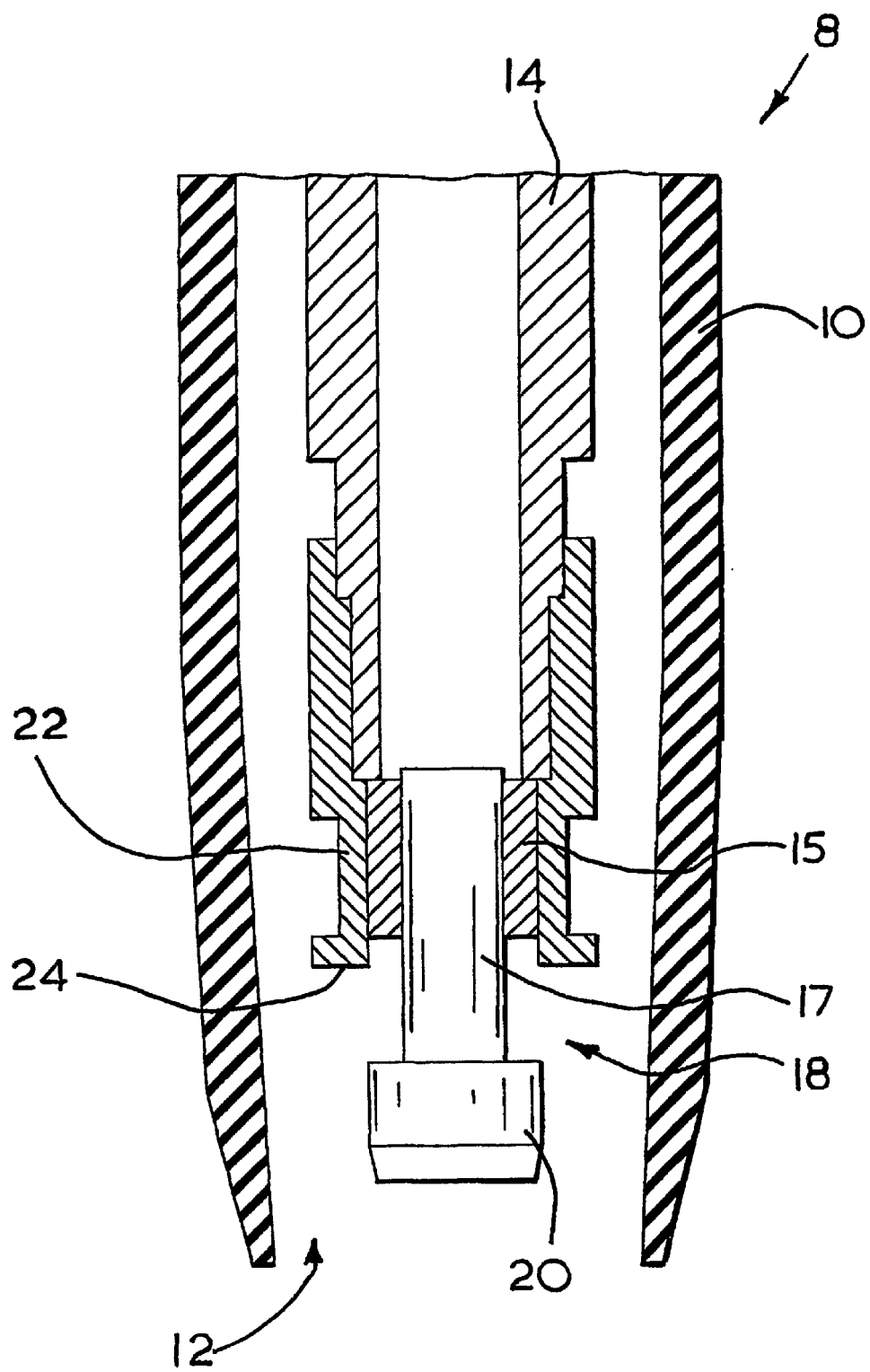
FIG. 1 is a cross sectional view of a conventional nozzle of an automatic weld head used in drawn arc welding of nuts (Prior Art).

Referring first to FIG. 1, there is shown a nozzle arrangement (8) of a conventional automatic weld head used in drawn arc welding. In the view shown in FIG. 1, the inner loading arm (14) is shown in a loaded position (relative to a sleeve (10)) although no component is shown. This is for convenience of description of the prior art.

The nozzle (8) comprises a hollow elongate cylindrical sleeve member (10) made of an electrically conductive material such as copper or brass. The sleeve further comprises elongate slots (not shown) extending upwardly from an open outermost end (12), which slots serve to allow radial expansion of the remote end of the sleeve if an internal radial force is applied. Due to the resilient nature of the sleeve, these slots serve to allow the passage of an object having a larger diameter than that of the unstressed sleeve if sufficient force is applied to that object. This will be described in more detail later.

The sleeve member (10) is mounted in electrical contact with a computerised weld control unit (not shown) as is conventional within the art. The weld control unit provides for controlling and application of the appropriate weld current.

Figure 3:
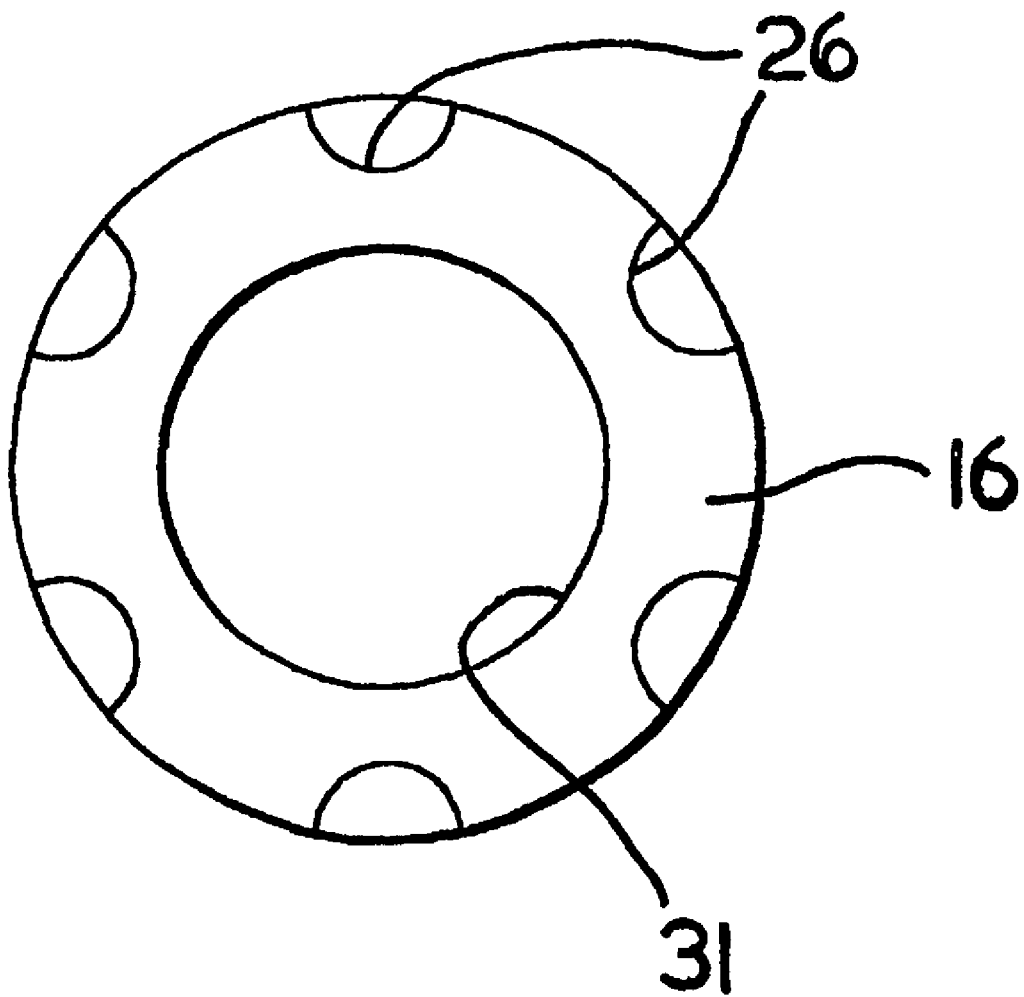
FIG. 3 is a plan view from above of the fluid control valve of the nozzle of FIG. 2.

The automatic weld head further comprises a loading arm (14) of substantially insulating material which is displaceable co-axial through the sleeve member (10) (vertically as viewed in FIG. 1 and FIG. 3). The loading arm is displaceable by conventional servo or electromechanical means which are again conventional within the art and need not be described in more detail. Operation of the drive mechanisms are again computer controlled—albeit that such computer control may be in response to an operation input, such as activation of a switch.

The loading arm (14) is substantially hollow and has mounted on its free end a cylindrical stop nut (15) mounted co-axial therewith. This nut (15) has mounted co-axial therein a ceramic or metal pin (18).

The pin (18) has a head (20) having a diameter substantially greater than that of the body (17) of the pin (18) whereby the head (20) projects externally of the loading arm (14).

The loading arm (14) further comprises an end stop member (22) again mounted co-axial therewith which presents a radially extending end faces (24) for engagement with an appropriate component.

Figure 2:
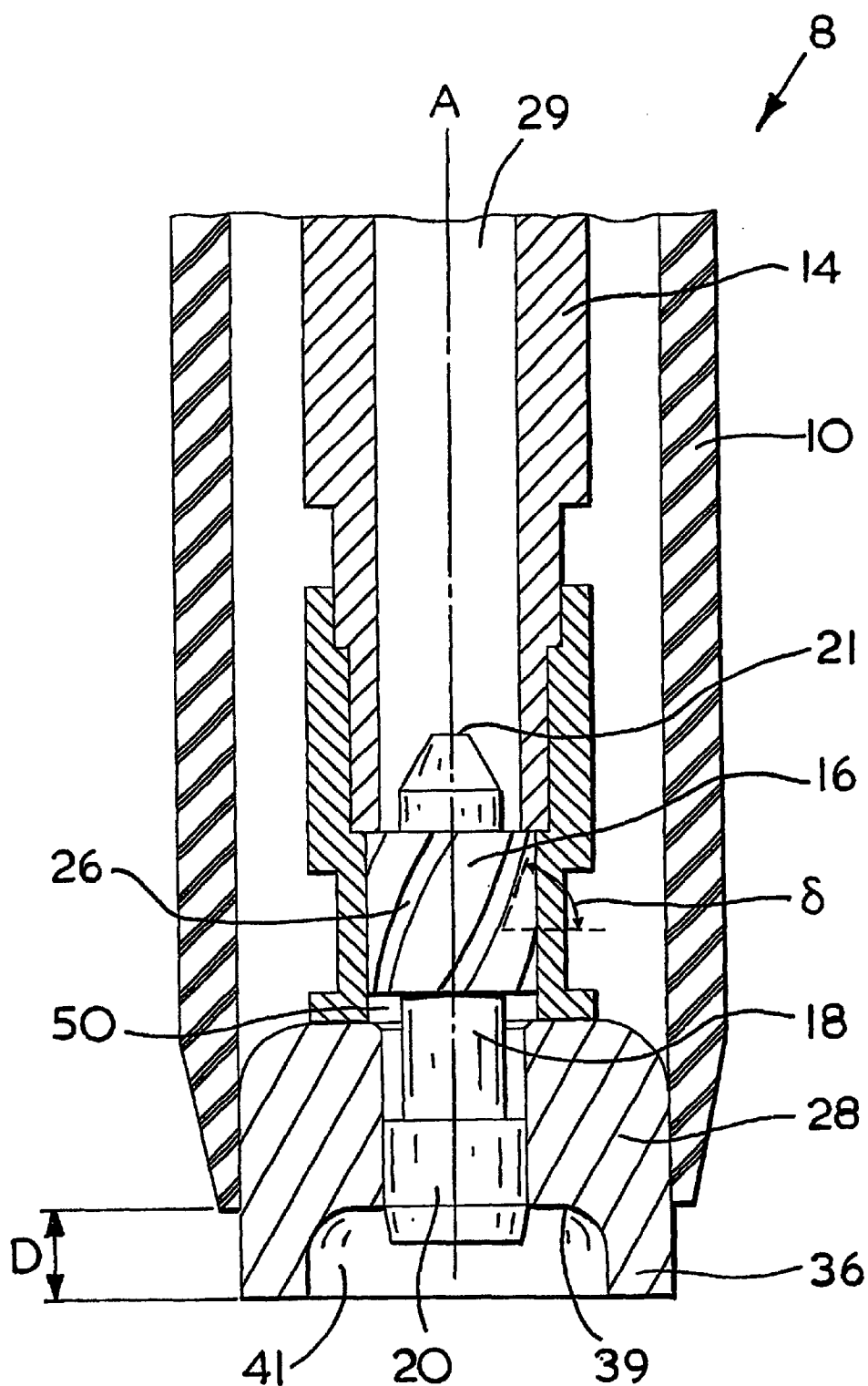
FIG. 2 is a cross sectional view of a nozzle of an automated weld head of the present invention with a loaded component.

Referring now to FIG. 2, the nozzle of the present invention is shown and corresponds substantially to the prior art with two exceptions to be described. Firstly, the design of the nozzle (8) again comprises a hollow elongate cylindrical sleeve member (10) housing a loading arm (14) similar to that described with reference to FIG. 1. Furthermore, the nozzle (8) shown in FIG. 2 is loaded with a component, in this case a rotary weld nut (28), which has been displaced axially through the outer sleeve (10). Basic loading and operation of the nozzle with this nut (28) will be described later.

The two major differences between the current invention and that of the prior art reside in the replacement of the stop nut (15) of the prior art with a cylindrical fluid control valve (16) again having co-axially mounted therein a pin member (18) wherein the pin (18) also enjoys in modification whereby its inwardly directed end (21) forms a truncated cone as it extends away from the free end (12) of the nozzle (8). The engagement between the valve (16) and the end stop member (22) and the arm (14) forms a substantially airtight fit and whereby engagement of the pin (18) within the valve (16) also forms a substantially airtight fit.

For clarity, whilst the nozzle (8) in FIG. 2 is shown in cross section, the valve (16) is shown in profile in order that its external configuration may be clearly seen.

The fluid control valve (16) comprises in its radial outer surface a series of six grooves (26) (which are shown in FIGS. 2 and 3) equally disposed angularly about the circumference (at 60° relative to each other) and which spiral about this outer surface at an angle (δ) of approximately 60° relative to a plane extending perpendicular to the axis (A) of such valve. These spiralling grooves (26) serve to provide for fluid communication between the hollow central chamber (29) of the loading arm (14) and the exterior thereof. The pin (18) serves to form a relative seal with the interior surface (31) of the cylindrical valve (16).

The loading arm (14) has connected thereto a pressurised fluid source (not shown) which is again controlled by the weld control unit, allowing fluid to be introduced into the loading arm (14) under pressure to be expelled through the fluid control valve along the appropriate spiralling grooves (26).

In operation the automatic weld head is mechanically displaceable by means of motor driven or hydraulically driven means into an engagement with a workpiece such as sheet metal. The weld head itself, in a rest configuration, will hold the loading arm (14) axially removed from the sleeve member (10). In operation a weld nut (28) is fed by means of an automated feeder to an entrance port (not shown) of the nozzle, at which stage the loading arm (14) is displaced so as to engage with the nut (28) whereby the pin head (20) is received within the central threaded aperture of the nut (28) in a substantially friction fit with the inwardly directed threads of such nut and to pass partially through said central aperture to project externally of said nut as the end faces (24) of the end stop (22) engage with an upper surface of said nut (see FIG. 2). Continued displacement of the loading arm into the sleeve member (10) effectively forces the nut (28) through said sleeve member (10).

The nut (28), as best seen in FIG. 2, varies slightly from a conventional nut in that it has on its lower face (39) a peripheral ridge (36). To improve weld performance this ridge may taper to an annular apex, having a "V" shaped configuration. The pin (18) projects externally of the threaded portion of the nut (28) so as to be partially received within a chamber (41) formed by this ridge (36).

Furthermore, the nut (28) will have a diameter slightly greater than the internal diameter of the sleeve member (10) to provide for frictional engagement between the nut and the sleeve. This serves to retain the nut from simply "falling" through the sleeve (10) as it is pushed through by the loading arm (14). This frictional fit further serves to restrain the nut (28) as the pin of the loading arm (14) is driven therethrough. As discussed above, the sleeve (10) has an array of longitudinally extending slits which permit for expansion of the sleeve (10) as the nut is forced therethrough. This allows for controlled displacement of the nut along the sleeve member (10) under force applied by the loading arm (14).

In operation, the nut is displaced through the sleeve (10) at a predetermined distance so that the outer ridge (36) of the nut projects externally from the sleeve (10) a predetermined distance (D) as best see in FIG. 2.

Figure 4:
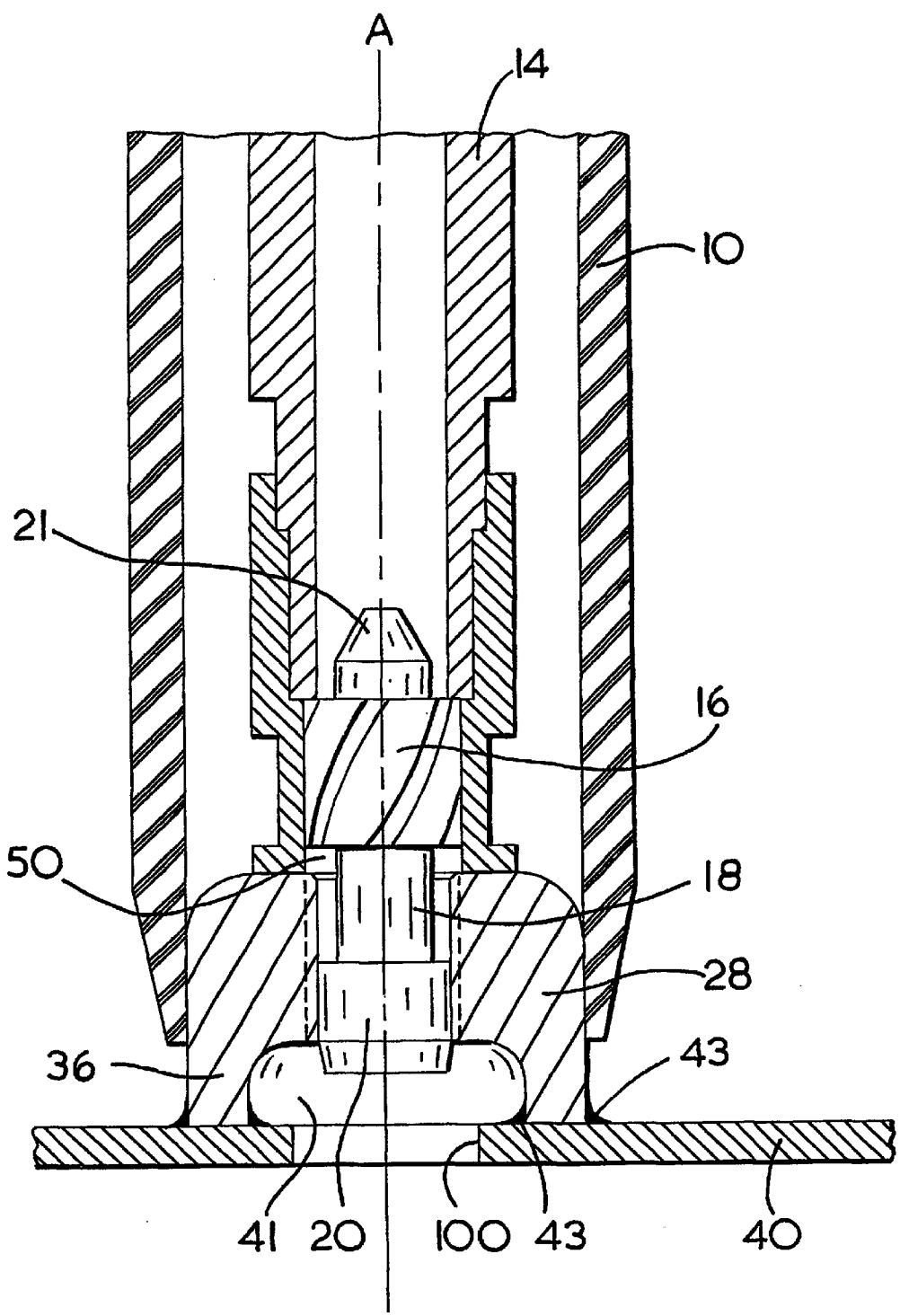
FIG. 4 is the nozzle of FIG. 2 showing operative connection of a weld nut to a metal sheet.

The automated weld head then serves to displace the nozzle (8) towards a metallic work surface (40). The work surface will usually comprise metallic sheet material, for example as used in the bodywork of an automobile. The work surface is maintained in electrical contact with the weld control unit, as is the weld nut (28) by virtue of electrical contact between the sleeve (10) and the weld nut (28). A low voltage is applied by the weld control unit which is able therefore to determine contact between the nut (28) and the work surface (40) since contact effects completion of the appropriate electrical circuit generated by the weld control unit. In this position the weld control unit, as is conventional, determines the exact relative position between the automatic weld head, weld nut and work surface and initialises a conventional weld cycle whereby the automatic weld head withdraws the weld nut away from the work surface and applies a weld current to the sleeve and nut (28) which induces a weld arc to form between the nut and the work surface creating a pool of molten metal to form on the ridge (36) of the weld nut and the work surface (40). Immediately following which, the weld head serves to plunge the nut (28) into the molten metal of the weld pool. As the weld pool solidifies it forms a homogenous joint between the nut and the metallic work surface which is usually stronger than the metallic components of the nut or work surface. The weld head then withdraws the sleeve (10) and loading arm (14) out of engagement with the nut (28), whereby the frictional engagement forces between the sleeve and the nut and the pin (18) and the nut (28) are overcome by the rigid engagement of the nut with the work surface. As seen in FIG. 4, the weld pool forms weld joints (43) around the inner and outer periphery of the ridge (36) of the nut (28).

In the welding operation described above, it has been found that this procedure can result in significant splashing of the molten metal due to the intense and rapid melting of the metal and as the nut is driven into engagement therewith. The droplets of molten metal formed by such splashes can land on the internal threads of the nut (28). In addition, due to impurities both in and on the surface of the nut and the work surface, notably carbon, the high temperatures generated by this type of welding procedure can result in the generation of vaporised impurities and burnt particles in the form of a smoke. These vaporised impurities and smoke may then condense and be deposited on the internal threads of the nut (28). Since the nut is intended to receive a fastening element, which may take the form of a screw or bolt, and may be intended to form an electrical engagement between the nut and any screw threaded fastener fixed thereto, then any impurities formed on the internal thread of the nut could adversely effect electrical contact whereas any molten material as splashed on the threads of the nut could prevent or make screw threaded engagement with a screw threaded fastener difficult. Thus the effects of both these forms of airborne fluid residue from the weld pool are detrimental to the efficiency of the welding process.

This problem has previously been partially addressed by the use of the pin (18) projecting through the central screw threaded portion of the nut to try and prevent splashes from engagement with the screw thread. However, such a feature is only partially successful since the pin head (20) is only capable of engagement with the innermost edges of the screw threads and thus an open channel is able to extend spirally about the pin head by means of the screw thread. This allows any vapourised impurities or smoke to pass over the internal screw threads and also allows any splashes to extend at least partially into the screw threaded region of the weld nut (28).

Therefore, the improved process of the current invention involves an additional process step during the actual arc welding presses. Referring to the improved weld nozzle of FIGS. 2 and 4, as the weld head lifts the nozzle arrangement (8) away from the work surface so as to create the weld arc, the weld control unit activates the pressurized fluid control mechanism (usually a valve or other standard fluid control unit) to introduce pressurized fluid, most usually pressurized air at a flow rate of approximately 10–20 liters per minute, into the hollow central area (29) of the loading arm (14) to thereby pass through the air control valve (16) by means of the spiral grooves (26) into a region (50) (or expansion chamber) between the pin head (20) and the fluid control valve (16) (and sealed by engagement between the nut (28) and stop member (22)) whereby such pressurized air is then forced through the screw threads of the nut about the in head (20) which creates a positive pressure preventing smoke or vaporized impurities or metallic splashes from entering the screw threaded area of the nut (28).

Furthermore, as seen from FIGS. 2 and 4, the innermost end (21) of the pin (18) comprises a truncated cone. Formation of this truncated cone serves to deflect the fluid flow inside the loading arm (14) towards the peripheral entrances to the formed spirals (26) of the fluid control valve (16). Reflection of the fluid flow by use of such a conical surface helps alleviate formation of eddy currents that could impair fluid flow into the spirals of the valve (16). Furthermore, in one embodiment of the invention shown in FIGS. 2 and 4, the fluid flow is allowed to expand once it has passed through the spiral grooves (26) of the fluid control valve (16) in the region (50) between the valve and the head of the pin (18). It has been found that by allowing the pressurized fluid or compressed air to expand in this region it helps to improve the vortex effect created by the spiralled grooves which vortex effect again assists in displacing the pressurized fluid or air to engage the spiral channel formed between the screw thread of the nut (28) and the pin head (20). It also serves to return the flow rate of the compressed air to the desired range of 10–20 liters per minute after the additional compression through the fluid control valve (16). Air at this flow rate is more readily received through the thread of the nut.

Figure 6:
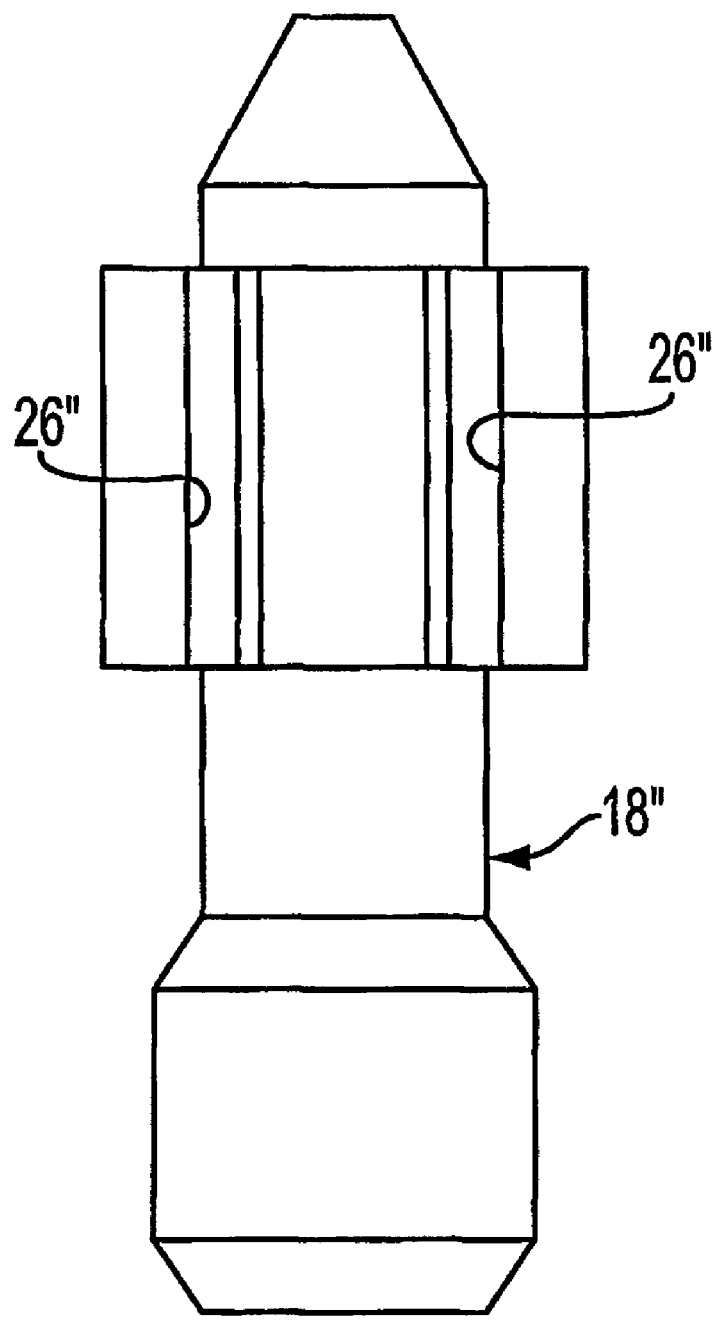
FIG. 6 shows another embodiment of the pin having co-axial grooves.

The angle ($\delta$) of the spiral grooves formed in the control valve (16) are set at approximately 60°. However it will be appreciated that this angle ($\delta$) may be varied from 10° right through to 90° (i.e. co-axial), as illustrated in FIG. 6, whilst still falling within the scope of the present invention. In fact, experimentation has indicated that co-axial grooves (26") on an alternative embodiment of the pin (18") may work as well or better than spiral grooves in preventing smoke or vaporised impurities or metallic splashes from entering the screw threaded area of the nut.

The use of spirals within the fluid control valve (16) are utilised primarily to create a vortex effect as the pressurised airflow engages with the spiral threads of the nut (28) to allow for effective fluid flow from the valve and through this threaded region of the nut. However, if the angle ($\delta$) increased to 90° then fluid under pressure will still be forced through the valve (16) into engagement with the threads of the nut (28) albeit efficiency may be slightly reduced. It will also be appreciated whilst the valve (16), as shown in FIGS. 2 and 3, utilise a series of grooves formed about the periphery of the valve (16) such grooves may equally be formed along the inner peripheral wall (31) of this cylindrical valve (16) or alternatively may simply be formed through the solid part of such valve. The critical criterion in this case is to provide for fluid communication between the interior of the arm (14) and the internal threaded region of the nut (28). The valve (16), in its simplest embodiment, may be removed completely.

Figure 5:
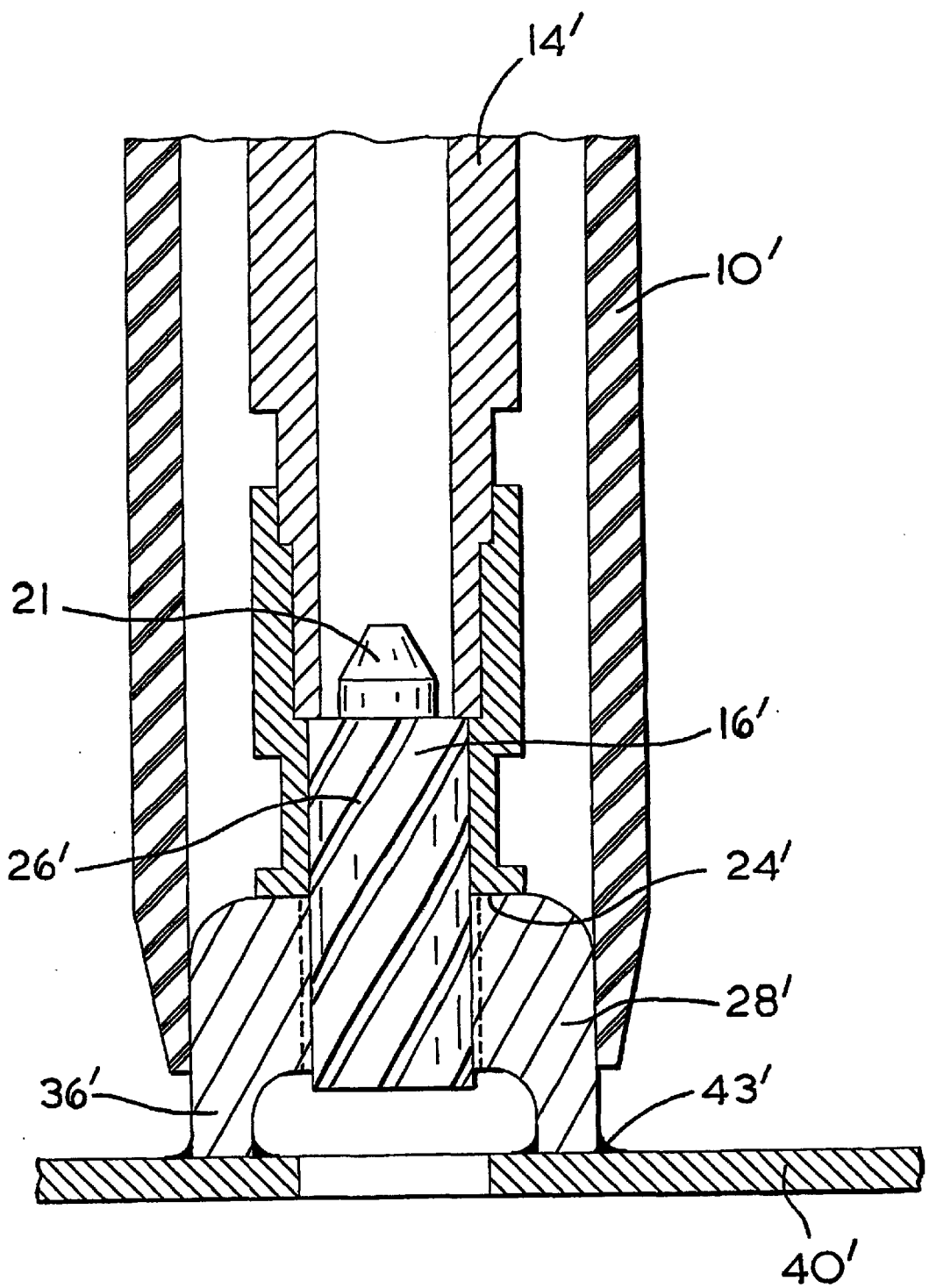
FIG. 5 shows a second embodiment of a nozzle of a weld head of the present invention.

FIG. 5 illustrates an alternative embodiment to the current invention. In this embodiment, the fluid control valve (16') is increased in size so as to replace the combined valve (16) and pin arrangement (18) of FIG. 2 so that the valve (16') projects externally of the arm (14) so as to pass through and frictionally engage with the internal thread of the nut (28'). In this embodiment the spiral grooves (26') engage directly with the internal threads of the nut to again pass pressurised fluid (compressed air) into the threaded region of said nut to create a positive pressure preventing transmission of vaporised gas and particles or molten metal splashes into the internal thread of the nut. Here again, the efficiency of the valve in the process can be varied by varying the angle of the grooves (26').

It will be appreciated that for utilisation of this invention with regard to a weld nut applied to a sheet metal surface as herein before described, then an aperture (100) is required to be formed through that sheet metal material to allow communication between the chamber (41) and a region having a lower pressure than the pressurised fluid introduced into the arm (14) to effect appropriate pressurised fluid flow. However, it will also be appreciated that the present invention is not limited to a welding process and apparatus for use solely with weld nuts but may also be extended to the welding of other components to a metallic surface. For example, the invention also has benefits within the field of stud welding. Stud welding involves a substantially identical process to that described for the welding of nuts to metallic surface but instead of nuts, the components are studs which comprise a substantially cylindrical threaded body having an enlarged head, usually circular and co-axial with the stud body. In this situation the head itself is welded directly to the metal in a manner identical to that previously described for the nut. When welded to a sheet metal such a stud is intended to receive a nut or other threaded fastener to provide a similar function to the nut previously described. Again the formation of molten metal on this threaded region due to splashing or the formation of impurity on carbon deposits by the formation of smoke and vaporised impurities will again be detrimental to this welding operation. Therefore, this invention is equally applicable to such stud welding by the introduction of a pressurised fluid flow over the threaded portion of the stud so as to force any gases produced by the welding process or molten metal droplets formed by splashing during the welding process (airborne fluid residue) to be forced away from the threaded region by virtue of such controlled pressurised fluid flow. Again compressed air is the most likely source of pressurised fluid. Here the fluid flow is used to form a "barrier" between the threaded region and the weld pool.

In its simplest form the invention could be embodied by the position of a simple tubular delivery valve positioned above the threaded region of a stud so as to direct air vertically downwards along the threaded region of the stud whereby it will engage the rear portion of the head of the stud and be deflected outwards thus providing the appropriate fluid barrier preventing splashes or smoke from travelling towards the threaded region. Alternatively, a series of fine nozzles could be displaced around the weld head to again direct pressurised air jets onto the back of the head of the stud (i.e. the surface of the stud head which is not brought into weld engagement with the weld pool) at such an angle that the pressurised gas is then deflected so as to pass over the surface of the stud head and displaced radially outwardly from the central portion to again effectively form a pressurised fluid barrier between the threaded region and the weld pool whilst meeting the objectives of this invention. In this manner the compressed air is not directed onto the weld joints themselves but merely flows radially away from the threaded central portion of the stud so as to deflect any smoke or molten droplets away from this threaded portion but without directly or adversely affecting the melt pool and weld joints about the periphery of the head of the stud. Obviously more complicated apparatus and methods may be employed to effect the same end result for stud welding.

It will also be appreciated for stud welding that the threaded portion itself need not be metallic but may be of plastics or other material provided that electrical contact can be achieved with a metal head of such a stud.

Furthermore, the fluid flow itself may comprise preheated air (or liquid) to prevent any undue enforced cooling of the melt pool during the weld process.

Whilst the specific embodiment of both the process and apparatus has been directed to use with an automated weld head system, it is equally applicable to a hand held welding gun which operates in a similar manner utilising a computerised weld control unit to control the actual welding operation but in this situation conventional a hand held weld gun would simply require an additional control unit to introduce the pressurised fluid upon operation of the trigger to effect manual welding. A hand held weld gun would require the operator to position the weld nut or weld stud in engagement with a metallic surface (40) and then to activate the weld gun by depressing a trigger. The weld gun will then comprise left means to withdraw the nozzle and nut from the metallic surface a sufficient distance to create the weld arc. Such a situation operation of the trigger switch of the gun would also introduce the appropriate flow of pressurised gas in the manner discussed with reference to the automated system above.

What is claimed is:

1. A method of welding a substantially metal component to a metal workpiece, comprising the steps of:
    engaging the component with a welding machine;
    circumferentially sealing a fluid flow region by direct engagement between a seal and only a predetermined portion of said component;
    creating a weld arc between said component and metal workpiece to create a weld pool of molten material; and
    initiating a pressurized fluid flow between the welding machine and the fluid flow region to deflect any airborne fluid residue of the weld pool away from said predetermined portion during the displacement of the component into the weld pool.

2. The method as claimed in claim 1 in which said component comprises a metal weld region and a connector region, said connector region forming the predetermined portion, comprising the steps of:
    creating the weld arc between said metal weld region of said component and metal workpiece to create the weld pool of molten material; and
    initiating the pressurized fluid flow so as to be disposed between the connector region of the component an the weld pool to deflect any airborne fluid residue of the weld pool away from said connector region of said component.

3. The method as claimed in claim 2, further comprising initiating the flow of pressurized fluid at least substantially simultaneously as the creation of the weld arc.

4. The method as claimed in claim 2, further comprising initiating the flow of pressurised fluid before the weld arc is created.

5. The method as claimed in claim 2, further comprising forming a threaded connector region.

6. The method as claimed in claim 5, further comprising the step of deflecting the pressurised fluid flow through the fluid flow region formed by a plurality of threads of the threaded connector region.

7. The method as claimed in claim 2 in which the component is a weld nut, comprising the step of directing said pressurised fluid flow through a central aperture of said nut.

8. The method as claimed in 1, comprising inducing a spiral flow path in the pressurized fluid flow.

9. The method as claimed in claim 8, comprising inducing the spiral flow path by passing said fluid through at least one spiral channel.

10. The method as claimed in claim 8, further comprising the step of causing the pressurized fluid to expand after the spiral flow path is induced in the fluid flow.

11. The method as claimed in claim 8, comprising passing the fluid flow through six spiral channels equally spaced angularly about a central axis.

12. The method as claimed in claim 9, comprising setting the at least one spiral channel to deflect the fluid flow at an angle of between 10° and 80° to a plan perpendicular to the direction of the fluid flow.

13. The method as claimed in claim 12, comprising setting the angle between 50° and 70°.

14. The method as claimed in claim 1, in which the pressurised fluid is compressed air further comprising directing the compressed air at a flow rate of between 5 and 30 liters per minute.

15. The method as claimed in claim 14, comprising directing the compressed air at a flow rate of between 10 and 20 liters per minute.

16. A welding apparatus for welding a substantially metal component to a metal workpiece, said component comprising a metal weld region and a connector region, said apparatus comprising:
a weld head operably holding said weld region of said component adjacent said workpiece and inducing a weld arc between said weld region and workpiece to create a weld pool of molten material, whereby the weld head subsequently displaces said weld region into said weld pool; a pressurized fluid source;
a fluid seal positionable adjacent only the connector region of said component; and
a fluid flow controller operably directing a fluid of the pressurized fluid source between said weld head and said connector region within the fluid seal and the weld pool so as to deflect any airborne fluid residue of the weld pool away from said connector region of said component.

17. The welding apparatus as claimed in claim 16, further comprising a second controller operably initiating fluid flow one of at least substantially simultaneously with and before the creation of the weld arc.

18. The welding apparatus as claimed in claim 16, for use with a component having a threaded connector region, in which said fluid flow controller comprises a directing member for engaging with a plurality of outer edges of said threaded connector region so as to form a substantially sealed thread channel therewith and to direct said fluid flow through said thread channel.

19. The welding apparatus as claimed in claim 18, for welding a weld nut, wherein said fluid flow controller comprises a substantially hollow fluid transmitting member with an end stop for substantially sealed engagement with an upper surface of said nut so as to direct said fluid flow through a central aperture of said nut.

20. The welding apparatus as claimed in claim 19, in which the directing member comprises a cylindrical body to be received within the central aperture of said nut.

21. The welding apparatus as claimed in claim 19, in which said fluid flow controller comprises a control valve disposed between said fluid source and said nut for inducing a spiral flow path in said fluid flow.

22. The welding apparatus as claimed in claim 20, in which said control valve comprises a solid body having at least one spiral channel extending therethrough.

23. The welding apparatus as claimed in claim 21, wherein the control valve is cylindrical having six spiral channels formed about its periphery so as to be spaced angularly equidistant thereabouts.

24. The welding apparatus as claimed in claim 22 which the at least one spiral channel is formed at an angle of between 10° and 80° to a plane perpendicular to a direction of fluid flow.

25. The welding apparatus as claimed in claim 21 in which said fluid flow controller comprises an expansion chamber into which the fluid enters after passing through said control valve, causing expansion of said pressurized fluid after spiral flow path is induced therein.

26. The welding apparatus as claimed in claim 25, in which said expansion chamber is formed between the control valve and said cylindrical body.

27. A method of welding a substantially metal component being a weld nut having a metal weld region and a connector region to a metal workpiece, comprising the steps of:
engaging the nut with a welding machine;
creating a weld arc between the metal weld region of the nut and metal workpiece to create a weld pool of molten material;
initiating a pressurized fluid flow between the welding machine and the nut so as to be disposed between the connector region of the nut and the weld pool to deflect any airborne fluid residue of the weld pool away from the connector region of the nut during the displacement of the nut into the weld pool;
directing the pressurized fluid flow through a central aperture of the nut; and;
placing an insert in frictional engagement with internal threads of the nut to form a sealed channel with the threads through which the fluid flow is directed.

28. A welding system, comprising:
a substantially metal weld nut having a metal weld region and a threaded connector region formed about a central aperture, the weld adapted for weld attachment to a metal workpiece;
a weld head having a sleeve operable to hold the weld region adjacent to the workpiece and induce a weld arc between the weld region and the workpiece to create a weld pool of molten material, wherein the weld head subsequently displaces the weld region into the weld pool;
a pressurized fluid source;
a fluid flow controller operable to direct a fluid from the pressurized fluid source between the weld head and the weld nut and the weld pool so as to deflect any airborne fluid residue of the weld pool away from the connector region of the weld nut;
a plurality of threads of the threaded connector region; and
a directing member including a cylindrical body engageable with the plurality of threads of the threaded connector region to form a substantially sealed thread channel and operable to direct the fluid through the thread channel.

29. A welding apparatus, comprising:
a substantially metal weld nut having a metal weld region, a threaded connector region formed about a central aperture and an upper surface, the weld nut adapted for weld attachment to a metal workpiece;
a weld head having a sleeve operable to hold the weld region adjacent to the workpiece and induce a weld arc between the weld region and the workpiece to create a weld pool of molten material, wherein the weld head subsequently displaces the weld region into the weld pool;
a pressurized fluid source operable to supply a fluid;
a fluid flow controller operable to direct the fluid between the weld head and the weld nut and the weld pool so as to deflect any airborne fluid residue of the weld pool away from the threaded connector region adjacent a central aperture of the weld nut, the fluid flow controller including:
a substantially hollow fluid transmitting member having an end stop for substantially sealed engagement with the upper surface of the weld nut, the transmitting member operable to direct the fluid through the central aperture of the weld nut;

a cylindrical directing member engageable with the threaded connector region to form a substantially sealed thread channel and operable to direct the fluid through the thread channel;

a control valve disposable between the fluid source and the weld nut for inducing a spiral flow path of the fluid; and a deflector member disposed in the flow path of the fluid in front of the control valve and angularly inclined in a direction of the flow path, the deflector member assisting to gradually deflect the fluid toward the thread channel.

30. The welding apparatus of claim 29, wherein the deflector member comprises a cone.

31. An arc welding apparatus, comprising:

a plurality of threaded weld connectors each having a plurality of threads;

a welding machine having a weld head capable of externally grasping the threaded weld connector;

a sealing element longitudinally displaceable in the weld head, the sealing element operable to contact the plurality of threads of the threaded weld connector such that a sealed channel is formed between the threads and the sealing element; and a pressurized fluid source connectable to the welding machine operable to supply a fluid flow within the sealed channel;

wherein during an operation when a weld arc is generated by the weld machine between the threaded weld connector and a metal workpiece to create a weld pool of molten material, and the weld connector is subsequently displaced into the weld pool, an airborne fluid residue of the weld pool is deflectable away from the threads of the threaded weld connector by the fluid flow.

32. The apparatus as claimed in claim 31, comprising means for inducing said fluid flow at least substantially simultaneously with the creation of the weld arc.

* * * * *